July 16, 1940.　　　A. J. ROCHOW　　　2,208,431

LIQUID MIXING SHAKER

Filed April 8, 1940

INVENTOR.
Arthur J. Rochow
BY
ATTORNEY.

Patented July 16, 1940

2,208,431

UNITED STATES PATENT OFFICE 2,208,431

LIQUID MIXING SHAKER

Arthur J. Rochow, Pittsford, N. Y.

Application April 8, 1940, Serial No. 328,544

2 Claims. (Cl. 259—72)

My present invention relates to agitators and more particularly to containers for shaking and mixing liquids, such as beverages and foods, and it has for its object to provide a simply constructed and convenient device of this character that may be made and sold at low cost but which will be fitted with contrivances whereby the agitation of the contents is increased beyond the results ordinarily attained by mere shaking. A further object of the invention is to provide a construction suitable for the making of a light shaker of sheet material that may be readily spun and stamped into shape without the assembling of additional parts. To these and other ends, the invention resides in certain improvements and combination of parts, all as will be hereinafter more fully described, the novel features being pointed out in the claims at the end of this specification.

In the drawing.

Similar reference numerals throughout the several views indicate the same parts.

Figure 1:
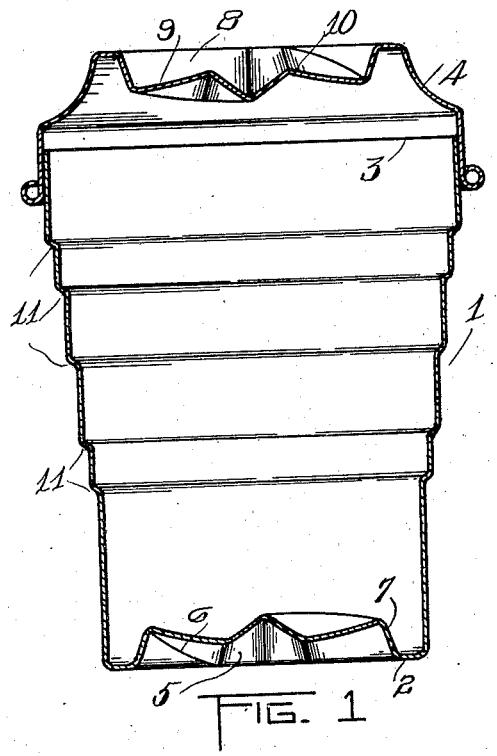
Fig. 1 is a central longitudinal or vertical sectional view through a shaker constructed in accordance with and illustrating one embodiment of my invention.
Figure 2:
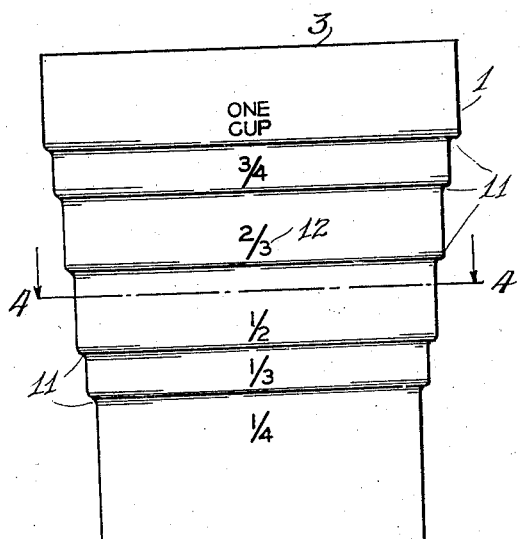
Fig. 2 is a side elevation of the body portion with cover removed.
Figure 3:
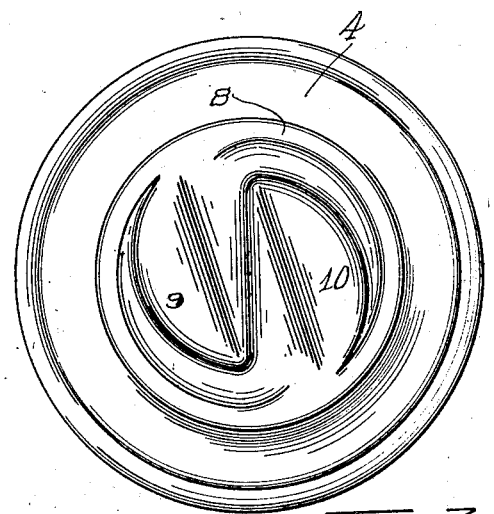
Fig. 3 is a top plan view.
Figure 4:
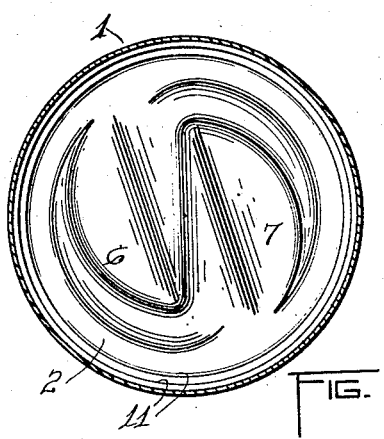
Fig. 4 is a top plan view of the bottom of the shaker taken in horizontal section on the line 4—4 of Fig. 2.
Figure 5:
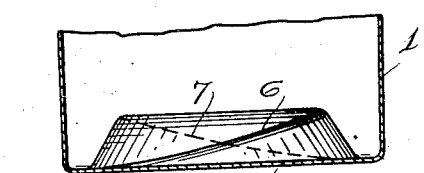
Fig. 5 is a vertical section through a fragment of the lower end of the shaker and the bottom thereof in the plane of the face of the inside wall thereof.

In the accompanying drawing, I have illustrated a familiar type of hand shaker comprising a generally cylindrical body 1 slightly tapered toward the fixed bottom 2 thereof and over the mouth 3 of which fits a detachable cover 4 held frictionally in place by a slight jamming action. The central portion of the bottom is stamped up inwardly to form a reentrant cavity indicated generally at 5, by which means there is presented on the interior one or more, in the present instance, two, inclined or pitched surfaces 6 and 7. They are oppositely inclined on opposite sides of the geometrical center, which means, of course, that they are similarly inclined in a circumferential direction in the manner of a propeller. The function of these surfaces is to impart a rotative or swirling motion to the body of contained liquid when the shaker is reciprocated violently and said body is alternately impinged against the bottom and the top.

The same die is preferably used to strike a complementary concavity 8 in the top of the cover 4 with the consequent production of similar pitched blade surfaces 9 and 10 at that end. If the same die is so used, the pitched surfaces at one end will act in opposition to those at the other end, that is operate with a tendency to reverse the direction of the swirl thereby increasing the agitation.

In addition to these instrumentalities, I provide projections on the sides of the body to augment the agitational effect. These consist of a plurality of internal and external shoulders 11 produced by a progressive series of reductions in both the inside and outside diameters of the shaker that result in giving it its generally downwardly tapered form. The shoulders and reductions are so spaced as to divide the capacity of the shaker in recognized units of volume, which units are respectively identified by indicia 12 stamped on the external surface.

The effect and function of these formations are two-fold—first, they break up the continuity of the inner wall into stepped projections in which the liquid contents are dashed in the process of shaking to increase the agitation and they are utilized in the measuring and proportioning of mixed ingredients. In the latter performance, it is to be noted that the liquid level can be readily observed from the inside and accurately determined. By this is meant that, if the device is held in the hand during measuring instead of being supported on a flat surface, the continuous shoulders provide means that inform the user whether or not he is holding the shaker level and hence obtaining a correct reading, for the surface of the liquid should meet the shoulder involved uniformly all the way around.

The reentrant cavity 5 in the bottom incident to the formation of the pitched surfaces 6 and 7 also increases the stability of the shaker when set down upon a flat surface.

My improved shaker will be found useful and efficient in agitating and mixing not only beverages and similar liquids but also more viscous materials, such as waffle and pancake batters, which may thereafter be readily and conveniently poured out for cooking. The shaker may then be cleansed of the residue by shaking hot water therein.

I claim as my invention:

1. A liquid mixing shaker having a closed elongated body and end walls including a sheet metal bottom having a central reentrant exterior cavity stamped therein forming pitched surfaces on the interior projecting internally of the container and oppositely inclined on opposite sides of the geometric center in a circumferential direction in the manner of a propeller to produce a swirling motion in the liquid.

2. A liquid mixing shaker having a closed elongated body and sheet metal end walls, the material of both of the latter having a conformation providing complementary pitched surfaces projecting internally of the container and oppositely inclined on opposite sides of the geometric center in a circumferential direction in the manner of a propeller to produce swirling motions in the liquid in opposite directions.

ARTHUR J. ROCHOW.